United States Patent [19]

Hendrix

[11] 4,117,684
[45] Oct. 3, 1978

[54] UNDERGROUND STORAGE

[75] Inventor: Hurshel V. Hendrix, Bartlesville, Okla.

[73] Assignee: Phillips Petroleum Company, Bartlesville, Okla.

[21] Appl. No.: 797,211

[22] Filed: May 16, 1977

[51] Int. Cl.² ............................................. E21F 17/16
[52] U.S. Cl. ....................................... 405/54; 137/386
[58] Field of Search ........................... 61/0.5, 1 R, 63; 137/386, 343, 561

[56] References Cited

U.S. PATENT DOCUMENTS

| 3,056,265 | 10/1962 | Swinney | 61/0.5 |
|---|---|---|---|
| 3,490,240 | 1/1970 | Preston | 61/0.5 |
| 3,505,821 | 4/1970 | Scisson et al. | 61/0.5 |
| 3,526,095 | 9/1970 | Peck | 61/0.5 |

Primary Examiner—Dennis L. Tayler

[57] ABSTRACT

A method is provided for preventing the accidental discharge of hydrocarbon from an underground storage cavern by the use of a pressure-sensing element connected in a brine discharge tube near or above the ground with the pressure-sensing element being operable for providing a signal which is proportional to the pressure in the tubing. The signal is transmitted to a valve which closes when a predetermined pressure level is obtained, thereby preventing further flow of liquid through the discharge tubing.

16 Claims, 2 Drawing Figures

UNDERGROUND STORAGE

The present invention relates to the control of the filling of underground storage caverns. Underground storage caverns have been found to be particularly useful for the storage of fluids such as ammonia and liquefied petroleum gases such as propane, butane, and the like. During the filling of underground storage caverns with a liquid product, the liquid product normally displaces a brine solution contained in the cavern by inducing the brine solution to flow upwardly through a discharge tubing. In some installations the discharge tubing is a conduit which is surrounded by the inlet conduit which introduces the liquid into the storage cavern. The discharge tubing has the open lower end thereof positioned adjacent a lower portion of the cavern as it is desired to fill the cavern with as much hydrocarbon as is possible while preventing the hydrocarbon from displacing sufficient brine so that the hydrocarbon would be discharged through the discharge conduit. Devices and methods are known in the art for preventing this such as that disclosed in U.S. Pat. No. 3,056,265, issued Oct. 2, 1962. This patent provides background information relating to the problems attendant with the operation of such storage caverns and to cavern formation. The major problem is being able to determine accurately the interface between the hydrocarbon and the brine so as to prevent the hydrocarbon level from going below the inlet of the discharge conduit. One method, as described in the above-cited patent, involves the measurement of the flow rate through the discharge conduit in the tubing positioned above the ground by the use of an orifice meter across which a pressure differential is measured to produce a signal which is representative of the flow rate of liquid in the conduit. The flow rate signal, which is a function of the square root of the differential pressure, is transmitted to control means for operating a valve connected in the discharge conduit for closing the valve when a predetermined pressure differential is achieved. Although such devices have been somewhat effective, two problems are attendant with their use. One is that only a low pressure differential can be realized across an orifice because the orifice needs to be large enough so as to not unduly impede flow of liquid through the discharge conduit. Such a pressure differential normally is up to about 3 psi. Another problem is that the tubes which communicate with the discharge conduit on opposite sides of the orifice plate are usually small in size and can become encrusted with residue in the brine. This affects the accuracy of the pressure differential measurements by the orifice meter which can cause malfunctioning and thereby improper operation of the shut-off valve with its attendant dangers. If positive operation is not achieved in the shutting off of the flow out of the brine discharge conduit, then the hydrocarbon can be released to the atmosphere and create a pollution and/or fire hazard.

The present invention provides an improvement to such a system by providing a more reliable flow shut-off means in the discharge conduit. The principal objects and advantages of the present invention are: to provide an apparatus and method of operation therefor which will positively shut off the flow of fluid through a discharge conduit connected to an underground storage cavern which is used to store a liquefied hydrocarbon or the like; and to provide such a method which is well adapted for its intended use and overcomes the above-described problems.

Other objects and advantages of the present invention will become apparent from the following detailed description taken in connection with the accompanying drawings wherein are set forth by way of illustration and example certain embodiments of this invention.

Figure 1:
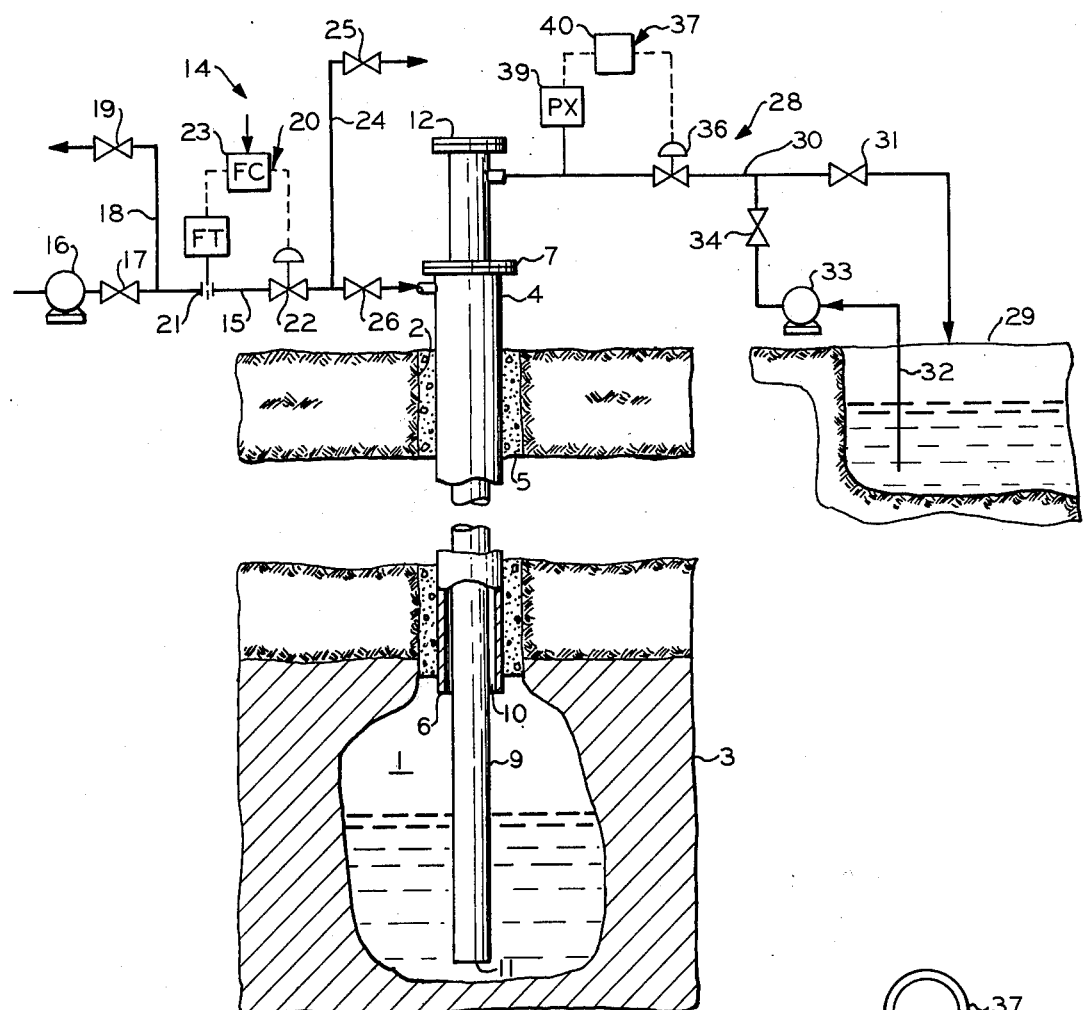
FIG. 1 is a schematic elevational view in partial section of an underground storage cavern provided with apparatus for conducting a method of shutting flow off from a discharge conduit connected to the storage cavern.
Figure 2:
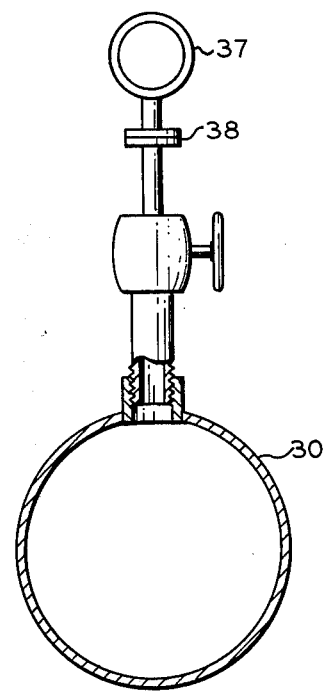
FIG. 2 is an enlarged sectional view showing details of the discharge conduit and portions of the pressure-sensing means associated therewith.

Referring more in detail to the drawings:

The reference numeral 1 designates generally an underground storage cavern having a borehole 2 communicating between the cavern 1 and the atmosphere. A casing 4 is positioned in the borehole 2 and is held in place, as for example, with cement 5 which is between the casing 4 and an impermeable underground formation 3. A lower disposed open end 6 opens into the cavern 1 while an upper end 7 extends above ground level and is sealed from the atmosphere. A second tubular member or conduit 9 is received within the casing 4 and is spaced from the interior surface thereof defining an annular flow passage 10 therebetween. The conduit 9 extends between an upper end 12 located at a position near the ground surface, and preferably above the ground, and an open lower end 11 positioned adjacent a lower disposed portion of the cavern 1. The conduit 9 forms a fluid flow path for the discharge of fluid from the cavern 1. The lower end 11 is spaced below the lower end 6 of the casing 4. Product inlet means 14 is provided and communicates with the casing 4 and is operable for the introduction of the product into the casing 4 and thereby into the cavern 1. The inlet means 14 includes a conduit 15 which is connected to a source of product (not shown). Pump means 16 is connected in the conduit 15 and is operable for pressurizing the hydrocarbon product to a desired pressure before introduction into the cavern 1. A valve 17 is connected in the conduit 15 just downstream of the pump 16 and is operable for shutting off flow of product from the cavern 1 back to the pump 16 or can also be used to selectively prevent flow of product from the pump 16 to the cavern 1. Downstream of the valve 17 a discharge conduit 18 is connected to the conduit 15 and has a valve 19 connected therein for selectively allowing product to flow out of the cavern 1 and to a point of use or back to a fractionating column as is desired. Positioned between the conduit 18 and the casing 4 there is provided flow control means 20 connected in the conduit 15 operable for controlling the flow into or out of a cavern. To this end a flow sensing element 21, such as an orifice element, is connected in the conduit 15 upstream of a flow control valve 22 wherein the valve 22 and the element 21 are operably connected to a flow controller 23 which receives a signal from the element 21 and is operable in response thereto to control the valve 22 so as to regulate the flow of product within the conduit 15. Such controllers are well known in the art.

It is to be understood that the conduit 15 can supply one or more storage caverns and in order to achieve this, between the flow control valve 22 and the casing 4, a manifold conduit 24 is connected to the conduit 15 and is operable for conducting product to other storage caverns as desired. The conduit 24 has connected therein a valve 25 so as to selectively allow flow to or from another cavern. Likewise, a valve 26 is connected in the conduit 15 between the conduit 24 and the casing 4 and is operable similar to the valve 25 to selectively allow flow of product into or out of the cavern 1.

Conduit means 28 is connected to the conduit 9 and is operable for conducting brine or other fluid discharged from the cavern 1 to a brine pond 29 for storage. In the illustrated structure the conduit means 28 includes a conduit 30 which is located near the earth surface and, preferably, is above ground level, forming a generally horizontal flow path between the conduit 9 and the pond 29 and has connected therein a manually actuatable valve 31 for selectively shutting off the flow of brine to the pond 29. The valve 31 is normally shut off when it is desired to pump brine via a conduit 32 which is connected to the conduit 30 and has connected therein a pump 33 for pressurizing brine from the pond 29 and injecting same into the cavern 1 via the conduit 30 and conduit 9. A valve 34 is connected in the conduit 32 between same and the conduit 30 so as to selectively shut off flow of fluid through the conduit 32. When brine is pumped into the cavern 1 from the pond 29 the valve 31 is closed and the valve 34 is open and when brine is being discharged from the cavern 1, the valve 34 is closed and the valve 31 is open.

A valve 36 is connected in the conduit 30 and is operable by actuation by actuating means 37 to selectively prevent flow of fluid from the cavern 1 into the pond 29. The actuating means 37 includes a pressure responsive or pressure-sensing element 38 which is positioned for having pressure applied thereto from the conduit 30 at a location preferably between the conduit 9 and the valve 36. Any suitable type of pressure-sensing element can be used such as, for example, those using a strain gauge on a diaphragm with the pressure-sensing element 38 being operable to sense the static pressure in the conduit 30. The element 38 is operably connected to a signal transmitter 39 which is operable in response to the pressure in the conduit 30 to generate a signal proportional to the pressure in the conduit 30 and transmit same to a pressure switch 40 which is operably connected to the valve 36 so that at a predetermined pressure, as measured by pressure sensor 38, the valve 36 will close. Such receivers and transmitters and elements are known in the art and a detailed description of same is therefore not necessary and any suitable type of transmitter, sensing element and receiver are appropriate. However, it is preferred that the element 38 of a type which seals the remainder of the actuating means from the brine in the conduit 30. This makes particularly advantageous the use of a diaphragm type of pressure-sensing element.

The present invention is more fully understood by a description of the operation thereof. Caverns 1 of the type used for storage of hydrocarbon product are deep, as for example, on the order of 1500 feet. Also, the discharge conduit 30 can be long, as for example, 700 feet. Both the inlet and outlet conduits 15 and 30, respectively, are large in diameter as, for example, about 8 inches. Product is injected into the cavern via the conduit 15 with the cavern 1 having a high level of brine therein with the brine preferably filling the cavern 1. The product can also be liquefied petroleum gas, liquefied propane, liquefied butane or gaseous ethylene. The product is lighter than or has a lesser density and is immiscible with the normally contained liquid in the cavern 1. The product is at a pressure sufficient to maintain the product in a liquid form. The product is immiscible with the brine thereby forming an interface therebetween. The more product is injected, the lower the level of brine in the cavern 1 with the displaced brine being discharged through the conduits 9 and 30. If the product level goes below the level of the open end 11 of the conduit 9, the product will then enter the conduit 9 and by being less in density than the brine, the product will rise in the conduit 9 and during rising the pressure on the product will be decreased because of the decreased brine head wherein the product will expand. The more the product expands, the faster the product will travel and the more volume it will occupy thereby causing an increased flow rate of brine through the conduit 30. By loss of head in the conduit 9, a drop in cavern pressure is also a result wherein the product will begin to expand appreciably and cause an even more rapid flow of product up the conduit 9 and out the brine discharge conduit 30 into the pond 29. This continues until a maximum flow rate is achieved and the flow rate is such as to cause a high pressure drop in the long conduit 30 which thereby raises the pressure in the conduit 30 adjacent the wellhead to a higher pressure as, for example, 100 psi or higher which can then be sensed by the element 38 to generate a signal proportional to the static pressure. When a predetermined pressure is reached, the receiver 40 effects closing of the valve 36 to thereby shut off the flow of product through the conduit 30 thereby preventing loss of the product out the conduit 30. The flow of product is terminated when the height of same is below a level in the conduit 9 of about 75% and preferably between about 30% and 75% and more preferably between 50% and 65% of the total height from the end 11 to the ground surface.

In order to illustrate the operability of the present invention, the following calculations are provided. The calculations are based on the Hazen and Williams formula for friction loss wherein the formula is $$\Delta P = 0.649 \, (Q/C)^{1.85} \times (S/d^{4.87})$$

$C$ = Roughness Factor of Pipe;
$Q$ = Flow Rate, BPD;
$S$ = Specific Gravity;
$d$ = ID of pipe, inches;
$\Delta P$ = Friction loss, PSI/100 ft.

The below quantities are based upon the brine having a specific gravity of 1.19 and the hydrocarbon product (LPG) having a specific gravity of 0.40 with the conduit 9 having a height of 1590 feet with an 8.125 inch inside diameter and the conduit 30 having a length of 700 feet and an inside diameter of 8.125 inches. In calculations no. 1 of the Table, it is assumed that the interface level is at the bottom of the conduit 9. The brine flow rate out is 37,000 BPD (barrels per day) or the same as the hydrocarbon product input rate. The friction loss in the conduits 9 and 30 was calculated and added to the static head of the brine in the conduit 9 to establish the cavern pressure. In calculations nos. 2 and 3 of the Table, the brine-hydrocarbon interface was assumed to be at the depths of 795 feet and 0 feet, respectively. The brine flow rate was determined by trial and error to arrive at friction losses, the sum of which would equal the difference between the cavern pressure and the sum of the static heads in conduit 9. Cavern pressure for calculations Nos. 2 and 3 were determined by the pressure reduction resulting from the removal of the net volume of hydrocarbon product (internal volume of tubing less the input volume) using a compressibility of factor of 0.00002 for the hydrocarbon product. From this the following values were obtained:

Table

| Calculations No. | Interface Level-Ft. | Static Head-PSI Brine | Static Head-PSI LPG | Frict. Loss-PSI Brine | Frict. Loss-PSI LPG | Cavern, Pressure, PSIG | Wellhead Pressure in Conduit 9-PSIG | Flow Velocity in Line 30 Ft./Sec | Brine Rate Out-BPD |
|---|---|---|---|---|---|---|---|---|---|
| 1 | 1590 | 819 | 0 | 37 | 0 | 856 | 11 | 6.7 | 37,000 |
| 2 | 795 | 410 | 138 | 252 | 45 | 845 | 117 | 23.6 | 131,000 |
| 3 | 0 | 0 | 275 | 317 | 242 | 834 | 315 | 40.4 | 224,000 |

The above figures indicate that a desirable pressure for actuating the valve 36 wound be about 120 psig at the wellhead or the end 12. It is to be noted, however, that different actuating pressures can be readily determined as above to achieve optimum results for different storage caverns.

It is to be understood that while there has been illustrated and described certain forms of this invention, it is not to be limited to the specific form or arrangement of parts and steps herein described and shown except to the extent that such limitations are found in the claims.

What is desired to be secured by Letters Patent is:

1. A method of controlling the filling of an underground storage cavern with a fluid product, said cavern comprising an underground cavity defined by an impermeable formation and an access bore defined by a surface and extending from said cavity to the ground surface, said cavern normally containing a displacing liquid heavier than and immiscible with said product with an interface formed therebetween, said cavern being provided with a conduit extending into said cavity and communicating with said cavity at its lower end, the lower end of said conduit being adjacent the bottom of said cavern at a point normally below said interface, said method comprising the steps of:
   introducing said product into said cavern via said access bore so as to displace a portion of said liquid from said cavern;
   discharging the displaced portion of the liquid from said cavern via said conduit;
   continuously measuring, at a point in said conduit adjacent the ground surface, the static pressure in said conduit;
   terminating the discharge of fluid through the conduit when said pressure reaches a predetermined level indicating presence of said product in said conduit; and
   terminating introduction of product into said cavern.

2. The method as set forth in claim 1 wherein said product is normally gaseous at atmospheric pressure.

3. The method as set forth in claim 2 wherein a signal proportional to the pressure is generated and a valve in said conduit is actuated responsive to said signal to selectively close said valve when a predetermined pressure is measured.

4. The method as set forth in claim 3 wherein the predetermined pressure is such that the height of the product in the conduit is below about 75% of the height of the conduit from its lower end to the ground surface.

5. The method as set forth in claim 2 wherein said liquid is brine and said product is liquefied petroleum gas.

6. The method as set forth in claim 2 wherein said liquid is brine and said product is liquefied propane.

7. The method as set forth in claim 2 wherein said liquid is brine and said product is liquefied butane.

8. The method as set forth in claim 2 wherein said liquid is brine and said product is gaseous ethylene.

9. A method as set forth in claim 3 wherein:
   the predetermined pressure is such that the height of the product in the conduit is between about 30 percent and about 75 percent of the height of the conduit from its lower end to the ground surface.

10. A method as set forth in claim 9 wherein:
    the predetermined pressure is such that the height of the product in the conduit is between about 50 percent and about 65 percent of the height of the conduit from its lower end to the ground surface.

11. An apparatus for controlling the filling of an underground storage cavern with a fluid product, said cavern comprising an underground cavity defined by an impermeable formation and an access bore defined by a surface and extending from said cavity to the ground surface, said cavern normally containing a displacing liquid heavier than and immiscible with said product with an interface formed therebetween, said apparatus including:
    inlet means communicating with said cavity via said access bore for introducing product into said cavity;
    a first conduit means having a lower end positioned adjacent a lower portion of said cavity with the said first conduit means extending upwardly therefrom to a position adjacent the ground surface, said first conduit means forming a flow passage;
    a first valve connected in said first conduit means at a position adjacent the ground surface;
    pressure-sensing means operably associated with said first conduit means between said valve and said lower end and operable for sensing static pressure in said conduit and providing a signal proportional to said static pressure with said pressure-sensing means being operably connected to said valve for selectively closing said valve at a predetermined pressure.

12. The apparatus as set forth in claim 11 wherein:
    said first conduit means includes a first conduit disposed generally vertically with one end being the lower end and also having an upper end positioned adjacent the ground surface, said first conduit means also including a second conduit opening into said first conduit at a position adjacent the ground surface with said pressure-sensing means and valve being connected in said second conduit with said pressure sensing means being connected in said second conduit between said valve and said first conduit.

13. The apparatus as set forth in claim 12 wherein:
    said pressure-sensing means includes a diaphragm having first and second opposite sides with said first side exposed to pressure in said second conduit, said pressure-sensing means also includes a pressure switch operably associated with said diaphragm on the second side, said pressure switch is operably connected to said valve for selectively effecting closing of the valve.

14. The apparatus as set forth in claim 12 wherein:
said pressure-sensing means is operable for closing said valve when said product is below a level of about 75 percent of the height of the first conduit from its lower end to the ground surface.
15. The apparatus as set forth in claim 14 wherein:
said pressure-sensing means is operable for closing said valve when said product in the first conduit is at a level of between about 30 percent and about 75 percent of the height of the first conduit from its lower end to the ground surface.
16. The apparatus as set forth in claim 15 wherein:
said pressure-sensing means is operable for closing said valve when the height of the product in the first conduit is at a level of between about 50 percent and about 65 percent of the height of the first conduit from its lower end to the ground surface.

* * * * *